Feb. 20, 1923.
A. C. WOODRUFF,
HEADLIGHT,
FILED MAR. 11, 1922.
1,446,236.
2 SHEETS—SHEET 2.
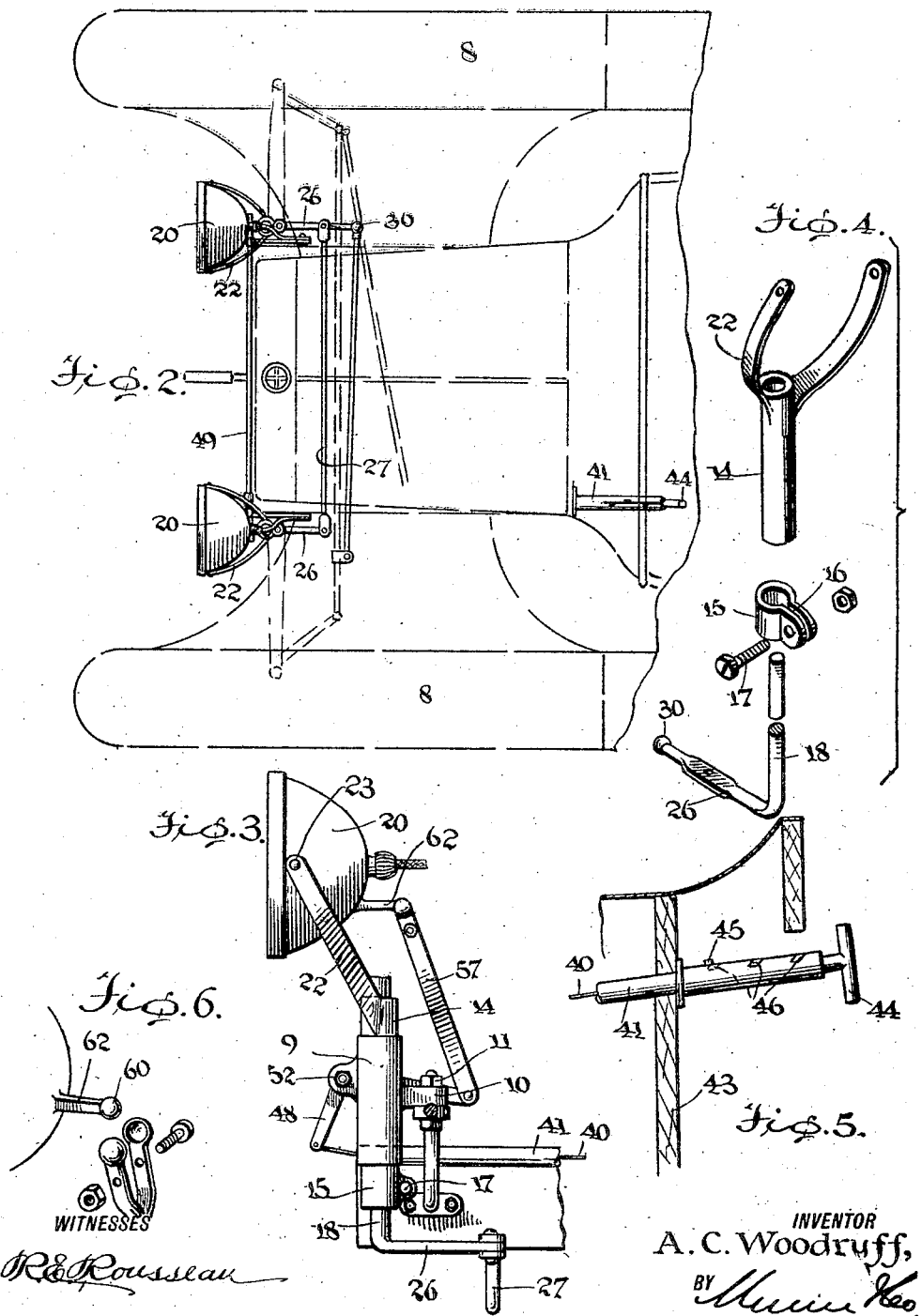
INVENTOR
A. C. Woodruff,
BY
ATTORNEYS Patented Feb. 20, 1923.

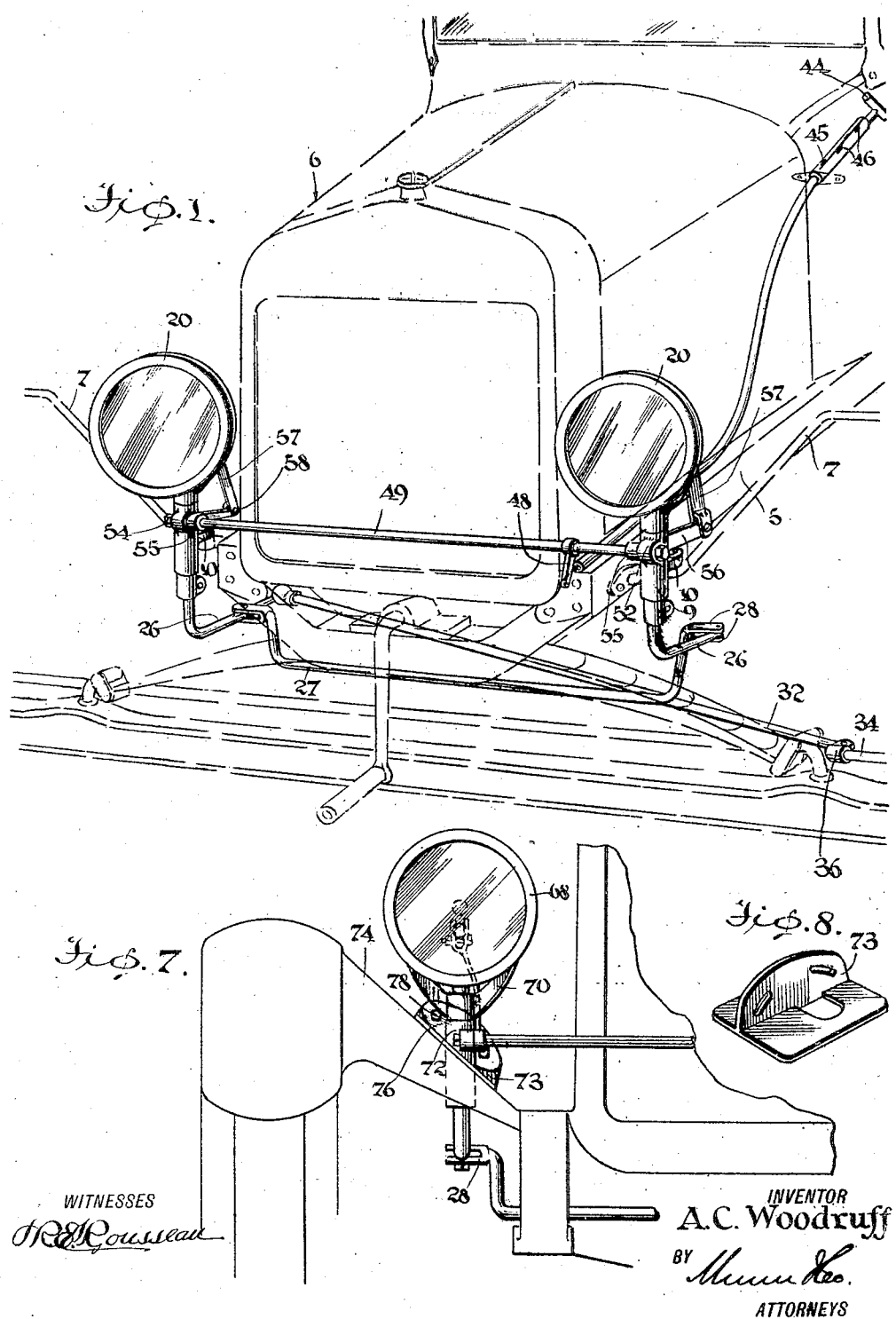

1,446,236

UNITED STATES PATENT OFFICE.

ALVIE CLIDE WOODRUFF, OF PORTLAND, OREGON.

HEADLIGHT.

Application filed March 11, 1922. Serial No. 542,836.

*To all whom it may concern:*

Be it known that I, ALVIE C. WOODRUFF, a citizen of the United States, and resident of Portland, in the county of Multnomah and State of Oregon, have invented certain new and useful Improvements in Headlights, of which the following is a specification.

This invention relates to dirigible headlights especially adapted for use on motor vehicles.

An important object of this invention is to provide a dirigible headlight having simple means whereby the same may be caused to turn to correspond to the movement of the front wheels of the vehicle so that the rays from the headlights are properly positioned with relation to the movement of the motor vehicle.

Also an important object is to provide a dirigible headlight having simple means whereby the same may be moved about a horizontal axis so that the light rays may be directed immediately in front of the vehicle to act as a dimmer whereby the drivers of approaching vehicles are not blinded by the headlights.

A further object is to provide a dirigible headlight which may be applied to a vehicle either during the course of manufacture or at any time thereafter without materially altering the construction of the same.

Further the invention aims to provide a dirigible headlight which is of highly simplified construction, reliable in use and cheap to manufacture.

Other objects and advantages of the invention will be apparent during the course of the following description.

In the accompanying drawing forming a part of this application and in which like numerals are employed to designate like parts throughout the same, Figure 1 is a perspective illustrating the invention in use.

Figure 2 is a plan view of a pair of the improved dirigible headlights applied.

Figure 3 is a side elevation of one of the improved headlights applied.

Figure 4 is a group perspective of one of the supporting means for the headlights.

Figure 5 is a detail sectional view illustrating the means for manually adjusting the headlights about a horizontal axis.

Figure 6 is a group perspective illustrating the means to connect the headlights with the adjusting means therefor.

Figure 7 is a fragmentary elevation illustrating a modification of the invention.

Figure 8 is a perspective of a support shown in Figure 7.

In the drawing the numeral 5 designates the frame of a motor vehicle, said motor vehicle being designated by the numeral 6 and being of any desired type. The supporting arms 7 of the fenders 8 constitute a means for supporting the improved headlights and the elongated bearing 9 of each headlight is provided with a rearwardly directed ear 10 secured to the intermediate portions of the adjacent arm 7 by means of bolts or other fastening devices 11.

The attaching portion 14 of each headlight fork is of tubular formation and is rotatably extended through the relatively stationary bearing 9. With reference to Figure 3 it will be observed that the tubular portion 14 of each headlight fork terminates below the bearing 9 and is engaged by a split collar 15 having its ends formed with apertured ears 16 for the reception of fastening devices 17. The split collar 15 not only serves as a means for limiting the upward movement of the headlight fork but also serves as a means to clamp the split tubular portion 14 securely in engagement with the operating shaft 18, which extends through the tubular portion.

The operating shaft 18 is extended upwardly through the tubular portion 14 and is securely connected to the tubular portion by means of the clamping collar 15 so that when the shaft is rotated the headlight fork will also be rotated whereby to cause the headlight 20 to turn either to the right or left.

The tubular portion 14 of each headlight fork has its upper portion provided with branches 22 between which the headlight is arranged and pivot elements 23 connect the terminal portions of the branches 22 to the headlight so as to permit the headlight to be swung about a horizontal axis for directing rays downwardly immediately in front of the vehicle or forwardly for a substantial distance.

The lower portions of the shafts 18 of which there are two are extended rearwardly to provide arms 26 to which the end portions of a link 27 are connected, the end portions of said link being offset and slotted to provide attaching members 28 which are pivoted to the upper and lower sides of the arms 26.

As illustrated in Figure 1, one of the arms 26 is extended beyond the link 27 and is formed with a spherical head 30 connected to the steering apparatus by means of a rod 32. Of course the ball and socket joint between the arm 26 and the link 32 permits the link 32 to partake of a longitudinal movement and a slight lateral movement during the operation of the steering mechanism. It will be seen that the attaching link or rod 32 is connected to the transversely extending steering rod 34 of the steering apparatus as indicated at 36.

In the operation of the improved dirigible headlight the movement of the rod 34 will result in the longitudinal movement of the attaching rod 32 which will cause the link 27 and the rearwardly directed arm 26 to be operated whereby the headlight is turned either to the right or to the left according to the direction of movement of the front wheels of the vehicle. Therefore, when the vehicle is making a turn to the right, the headlights will also be turned to the right so as to illuminate the roadway.

The headlights may also be moved about a horizontal axis by means of a flexible control rod 40 movable through a tube 41 which as illustrated in Figure 5 extends through the dash 43 of the vehicle. The rear end of the control rod 40 is provided with a handle 44 arranged within convenient reach of the operator. The flexible control rod 40 may be held in an adjusted position by means of a locking pin 45 which may be received within the diagonal branches 46 of the slot which extends longitudinally in the rear portion of the tubular member 41. Since the branches 46 of the longitudinal slot extend diagonally from the slot when the pin 45 is received in one of the branches the adjusting rod 40 is securely and positively held in a set position.

The forward portion of the adjusting rod 40 is connected to a crank 48 extended downwardly from a transverse shaft 49 which as illustrated in Figure 1 extends across the radiator of the vehicle and is extended through ears 52 formed on the bearings 9. The ears 52 are engaged by collars 55 formed on the transversely extending shaft and the outer sides of the ears are engaged by nuts 54 which cooperate with the collars 53 in securely connecting the shaft 49 to the bearings 9. However the shaft 49 may partake of a rocking motion when operated by the flexible rod 40 and the connection between the shaft and the bearings 9 braces the bearings so that the vibrations of the vehicle will not loosen the headlights.

The end portions of the shaft are provided with rearwardly directed cranks 56 connected to upwardly directed links 57 by means of pivot elements 58.

As illustrated in Figure 6 each link 57 consists of a pair of sections having their upper portions formed with sockets adapted to engage the sphere shaped head 60 having a shank 62 connected to the rear side of the headlight. More specifically it will be seen that the upper portion of the link 57 is formed with a pair of socket members each of which partially receives the sphere shaped head 60 whereby to provide a universal connection between the headlight and the link.

The universal connection between the links 57 and the several headlights permit the headlights to be turned either to the right or to the left without interference with the means for turning the headlights about a horizontal axis.

With reference to the foregoing description taken in connection with the accompanying drawing it will be seen that the improved dirigible headlight is not only provided with means whereby the headlight may be turned either to the right or to the left but also with mechanical means whereby the headlights may be turned about a horizontal axis so that when necessary the lights may be turned down.

In the form of the invention illustrated in Figure 7 the headlight which is designated by the numeral 68 is supported by a fork 70 having rotatable connection with the bearing member 72 of a supporting or attaching plate 73 which may be connected to the fender 74 of the motor vehicle. The position of the bearing member 73 may be varied by the adjustment of the plate 76 which is held in position by means of fastening devices 78. This form of the invention is especially adapted for use when employing the headlight on automobiles other than the Ford.

Having thus described the invention what I claim is:—

1. A dirigible headlight for automobiles comprising bearings, forks having tubular attaching portions passing through said bearings, headlights carried by said forks, shafts extending through and securely connected to said tubular attaching portions and having means whereby the same may be connected to the steering mechanism of the automobile, and rods connected to said bearings.

2. A dirigible headlight for automobiles comprising bearings, forks having tubular attaching portions passing through said bearings, headlights carried by said forks, shafts extending through and securely connected to said tubular attaching portions and having means whereby the same may be connected to the steering mechanism of the automobile, rods connected to said bearings, cranks connected to said rod, links connecting said cranks and said headlights, and manually controlled means for turning said rod and consequently tilting said headlights.

3. In combination with a vehicle headlight, of a fork having branches supporting the same and having a tubular attaching portion, a bearing receiving said tubular portion, an operating shaft extending through said tubular portion, and a split collar surrounding said tubular portion and having means to secure the same to said shaft whereby the movement of the shaft operates the fork.

4. In combination with a vehicle headlight, of a fork having branches supporting the same and having a tubular attaching portion, a bearing receiving said tubular portion, an operating shaft extending through said tubular portion, a split collar surrounding said tubular portion and having means to secure the same to said shaft whereby the movement of the shaft operates the fork, and automatic means whereby the movement of the vehicle operates said shaft.

5. In a vehicle headlight, the combination of a pair of vertically arranged bearing members, of forks rotatably extended through said bearing members and having their lower portions terminating below the bearing members and split longitudinally, gripping devices secured to the lower portions of said forks and limiting the upward movement of the forks, and operating shafts extending through said forks and locked thereto.

6. In a dirigible headlight, the combination with a pair of vertically arranged bearing members, of a pair of forks having tubular portions extending through said bearing members and terminating below the same, operating shafts extended through said tubular portions, collars surrounding the lower portions of said tubular portions and limiting the upward movement of the forks, said collars also gripping said tubular portions with said shafts, and means connecting the bearings and having means for swinging the headlights carried by said forks.

7. In a dirigible headlight, the combination with a plurality of vertically arranged bearing members having means whereby the same may be secured to a motor vehicle, of forks having depending tubular portions rotatably extended through said bearings and having their lower portions split longitudinally and terminating below said bearings, operating shafts extending through said tubular portions, collars securing the split tubular portions to said shaft and limiting the upward movement of said tubular portions, headlights carried by said forks, and means whereby to tilt said headlights horizontally.

ALVIE CLIDE WOODRUFF.